(12) United States Patent
Griechen et al.

(10) Patent No.: US 11,248,372 B2
(45) Date of Patent: Feb. 15, 2022

(54) SMART CORNER AND WALL FRAME SYSTEM

(71) Applicant: VBC Tracy LLC, Philadelphia, PA (US)

(72) Inventors: Darrin Griechen, Spokane, WA (US); Robert Stanford, Flowery Branch, GA (US)

(73) Assignee: VBC Tracy LLC, Philadelphia, PA (US)

( * ) Notice: Subject to any disclaimer, the term of this patent is extended or adjusted under 35 U.S.C. 154(b) by 0 days.

(21) Appl. No.: 17/190,734

(22) Filed: Mar. 3, 2021

(65) Prior Publication Data

US 2021/0189713 A1  Jun. 24, 2021

Related U.S. Application Data

(63) Continuation of application No. 16/682,113, filed on Nov. 13, 2019, now Pat. No. 10,975,562.

(Continued)

(51) Int. Cl.
*E04B 1/19* (2006.01)
*E04B 1/26* (2006.01)
(Continued)

(52) U.S. Cl.
CPC .......... *E04B 1/1903* (2013.01); *E04B 1/2403* (2013.01); *E04B 1/2604* (2013.01); *E04F 15/0215* (2013.01); *B32B 2307/102* (2013.01); *B32B 2419/04* (2013.01); *B32B 2471/00* (2013.01); *E04B 2001/1993* (2013.01); *E04B 2001/2406* (2013.01); *E04B 2001/2415* (2013.01); *E04B 2001/2418* (2013.01); *E04B 2001/2466* (2013.01); *E04B 2001/2644* (2013.01); *E04B 2001/2652* (2013.01); *E04B 2001/2676* (2013.01); *E04F 2290/043* (2013.01)

(58) Field of Classification Search
CPC .... E04B 1/1903; E04B 1/2604; E04B 1/2403; E04B 2001/2644; E04B 2001/2676; E04B 2001/1993; E04B 2001/2415; E04B 2001/2466; E04B 2001/2418; E04B 2001/2652; E04B 2001/2406; E04F 15/0215; E04F 2290/043; B32B 2307/102; B32B 2419/04; B32B 2471/00
USPC .......................................... 52/272
See application file for complete search history.

(56) References Cited

U.S. PATENT DOCUMENTS 3,393,887 A ‡ 7/1968 Birger ............... F16B 12/50
                                              248/188
3,470,663 A ‡ 10/1969 Tate ................ E04F 15/02482
                                              52/126

(Continued)

FOREIGN PATENT DOCUMENTS

DE       3910700 C1 ‡ 5/1990 ........... A47B 21/03

*Primary Examiner* — Rodney Mintz
(74) *Attorney, Agent, or Firm* — Volpe Koenig

(57) ABSTRACT

In one aspect, a smart corner is provided that can be prefabricated. The smart corner comprises a rear side including a first hole, a first side including a second hole, a second side including a third hole, and a top. A wall frame is also provided. The wall frame includes a top plate, a bottom plate, studs, and four smart corners. A framing system is also provided comprising at least two wall frames. The at least two wall frames connect via the smart corners.

19 Claims, 10 Drawing Sheets

Related U.S. Application Data

(60) Provisional application No. 62/760,432, filed on Nov. 13, 2018.

(51) Int. Cl.
  *E04B 1/24* (2006.01)
  *E04F 15/02* (2006.01)

(56) References Cited

U.S. PATENT DOCUMENTS

| | | | | |
|---|---|---|---|---|
| 3,487,598 A ‡ | 1/1970 | Lopina | E04B 2/56 | 52/126 |
| 3,902,293 A ‡ | 9/1975 | Witt | E04F 15/02 | 52/392 |
| 4,065,818 A ‡ | 1/1978 | Farina | A47C 19/021 | 248/188 |
| 4,256,798 A ‡ | 3/1981 | Witt | B32B 21/10 | 428/21 |
| 4,347,015 A ‡ | 8/1982 | Olashaw | F16B 12/50 | 403/171 |
| 4,521,941 A * | 6/1985 | Gerhard | B65D 90/0026 | 220/1.5 |
| 4,527,364 A ‡ | 7/1985 | Baus | F16B 12/50 | 52/127 |
| 4,832,995 A ‡ | 5/1989 | McLauchlin | B28B 11/00 | 156/26 |
| 5,305,567 A ‡ | 4/1994 | Wittler | E04B 2/7425 | 160/13 |
| 5,318,832 A ‡ | 6/1994 | Fishel | B32B 5/26 | 442/39 |
| 5,600,924 A ‡ | 2/1997 | Forsberg | E04B 1/24 | 52/276 |
| 5,683,198 A ‡ | 11/1997 | Leutenegger | F16B 7/18 | 403/23 |
| 5,860,255 A ‡ | 1/1999 | Fishel | B32B 27/12 | 52/169 |
| 6,061,993 A ‡ | 5/2000 | Bendixen | E04C 2/365 | 52/783 |
| 6,093,473 A ‡ | 7/2000 | Min | B32B 27/10 | 428/14 |
| 6,141,926 A ‡ | 11/2000 | Rossiter | E04B 2/7425 | 160/13 |
| 6,182,903 B1 ‡ | 2/2001 | Fiedrich | F24D 3/142 | 237/69 |
| 6,343,451 B1 ‡ | 2/2002 | Chih | B32B 3/30 | 52/312 |
| 6,471,434 B2 ‡ | 10/2002 | Chin | A47B 13/06 | 312/14 |
| 6,481,177 B1 ‡ | 11/2002 | Wood | F16B 7/187 | 52/656 |
| 6,708,357 B2 ‡ | 3/2004 | Gaboury | A47C 23/007 | 5/663 |
| 6,732,478 B1 ‡ | 5/2004 | Russell | E04B 5/14 | 52/126 |
| 6,761,794 B2 ‡ | 7/2004 | Mott | B29B 17/0042 | 156/27 |
| 6,803,110 B2 ‡ | 10/2004 | Drees | B44C 3/02 | 428/14 |
| 6,837,389 B2 ‡ | 1/2005 | Gassler | E04B 2/766 | 211/18 |
| 6,986,934 B2 ‡ | 1/2006 | Chen | B29C 65/564 | 428/19 |
| 7,364,243 B2 ‡ | 4/2008 | Wyatt | H02B 1/30 | 211/182 |
| 7,398,621 B2 ‡ | 7/2008 | Banta | F16B 7/0486 | 52/93 |
| 7,431,975 B2 ‡ | 10/2008 | Zafiroglu | B32B 3/28 | 156/29 |
| 7,462,400 B2 ‡ | 12/2008 | Roh | B32B 3/06 | 428/48 |
| 7,527,865 B2 ‡ | 5/2009 | Kessing | B32B 27/40 | 428/42 |
| 7,694,483 B1 ‡ | 4/2010 | Tucker | E04C 3/28 | 52/481 |
| 7,833,916 B2 ‡ | 11/2010 | Leeser | E04B 1/78 | 442/11 |
| 7,886,488 B2 ‡ | 2/2011 | Payne, Jr. | E04F 15/203 | 52/144 |
| 7,941,985 B2 ‡ | 5/2011 | Simmons | E04B 1/24 | 52/655 |
| 8,056,292 B2 ‡ | 11/2011 | Swanson | E04F 15/186 | 52/403 |
| 8,397,864 B2 ‡ | 3/2013 | Tinianov | E04B 2/7409 | 181/29 |
| 8,448,399 B2 ‡ | 5/2013 | Kornfalt | B32B 21/02 | 52/395 |
| 8,635,830 B2 ‡ | 1/2014 | Schold | E04B 1/19 | 52/650 |
| 8,720,144 B2 ‡ | 5/2014 | Keane | E04F 15/107 | 52/403 |
| 9,103,115 B2 ‡ | 8/2015 | Wolf | B32B 3/12 | |
| 9,156,233 B2 ‡ | 10/2015 | Dossche | B32B 21/14 | |
| D744,317 S ‡ | 12/2015 | Densberger | D8/354 | |
| 9,228,337 B2 ‡ | 1/2016 | Chong | E04C 3/04 | |
| 9,340,970 B2 ‡ | 5/2016 | Dodge, III | B32B 38/0036 | |
| 9,409,381 B2 ‡ | 8/2016 | Chang | E04F 15/02155 | |
| 9,441,357 B1 ‡ | 9/2016 | Vafaee | E04B 1/34869 | |
| 9,453,349 B2 ‡ | 9/2016 | Pallon | B32B 21/14 | |
| 9,630,388 B2 ‡ | 4/2017 | Song | B29C 48/0012 | |
| 9,717,372 B2 ‡ | 8/2017 | Wei | A47K 3/30 | |
| 9,739,067 B2 ‡ | 8/2017 | Zhang | B29C 59/02 | |
| 9,890,530 B2 ‡ | 2/2018 | Tierney | B32B 27/12 | |
| 9,920,531 B1 ‡ | 3/2018 | Charest | E04C 3/12 | |
| 9,920,534 B2 ‡ | 3/2018 | Albert | E04F 10/005 | |
| 10,094,104 B2 ‡ | 10/2018 | Higgins | E04H 15/62 | |
| 10,094,126 B2 ‡ | 10/2018 | Collison | B32B 29/005 | |
| 10,316,509 B2 ‡ | 6/2019 | Jackson | E04B 1/2403 | |
| 10,689,840 B2 * | 6/2020 | Bonlin | E04B 1/34331 | |
| 10,975,562 B2 * | 4/2021 | Griechen | E04B 1/2604 | |
| 2003/0109172 A1 ‡ | 6/2003 | Foden | E04B 5/48 | 439/53 |
| 2004/0003888 A1 ‡ | 1/2004 | Mott | E04F 19/02 | 156/26 |
| 2005/0235596 A1 ‡ | 10/2005 | Pegorado | E06B 3/9646 | 52/656 |
| 2006/0068213 A1 ‡ | 3/2006 | O'Brien | B32B 7/12 | 428/52 |
| 2006/0193687 A1 ‡ | 8/2006 | Ghosh | E04B 1/2604 | 403/40 |
| 2006/0234027 A1 ‡ | 10/2006 | Huusken | B32B 33/00 | 428/29 |
| 2006/0265992 A1 ‡ | 11/2006 | Hiragaki | E04B 5/43 | 52/633 |
| 2007/0000198 A1 ‡ | 1/2007 | Payne, Jr. | E04B 5/10 | 52/414 |
| 2007/0175163 A1 ‡ | 8/2007 | Williams | E04H 4/00 | 52/656 |
| 2007/0186503 A1 ‡ | 8/2007 | Homma | E04B 1/2604 | 52/655 |
| 2008/0026688 A1 ‡ | 1/2008 | Musick | B08B 1/00 | 454/18 |
| 2008/0017855 A1 ‡ | 7/2008 | Porter | E04B 1/24 | 52/653 |
| 2009/0190996 A1 ‡ | 7/2009 | Clarke | F16B 37/145 | 403/18 |
| 2010/0175186 A1 ‡ | 7/2010 | Harrow | A47C 21/026 | 5/400 |
| 2011/0280649 A1 ‡ | 11/2011 | Dewson | E04B 1/26 | 403/17 |
| 2011/0308063 A1 ‡ | 12/2011 | Feeleus | E04B 1/26 | 29/525 |
| 2012/0091273 A1 ‡ | 4/2012 | Barmichev | B64D 9/00 | 244/11 |
| 2012/0128405 A1 ‡ | 5/2012 | Yanik | F16B 7/185 | 403/42 |
| 2014/0021090 A1 ‡ | 1/2014 | Meyer-Horn | B65D 19/38 | 206/600 |
| 2014/0220874 A1 ‡ | 8/2014 | Meyer | F24D 19/1096 | 454/15 |

(56) References Cited

U.S. PATENT DOCUMENTS

| | | | |
|---|---|---|---|
| 2015/0082736 A1‡ | 3/2015 | Kang | E04G 17/075 52/656 |
| 2016/0002910 A1‡ | 1/2016 | Green | F16B 7/042 52/848 |
| 2016/0083960 A1‡ | 3/2016 | Gleeson | B32B 13/047 52/483 |
| 2016/0340914 A1‡ | 11/2016 | Edmonds | E04B 1/8409 |
| 2017/0221468 A1‡ | 8/2017 | Forrest | D06M 11/00 |
| 2017/0261022 A1‡ | 9/2017 | Schirmer | F16B 12/54 |
| 2018/0058078 A1‡ | 3/2018 | Kwon | B32B 27/304 |
| 2018/0238041 A1* | 8/2018 | Styrc | E04B 1/1912 |
| 2019/0153720 A1* | 5/2019 | Bonlin | E04B 1/3483 |
| 2020/0149266 A1* | 5/2020 | Griechen | E04B 2/58 |
| 2021/0054613 A1* | 2/2021 | Peck | E04B 1/34321 |

\* cited by examiner
‡ imported from a related application

SMART CORNER AND WALL FRAME SYSTEM

CROSS REFERENCE TO RELATED APPLICATION

This application is a continuation of U.S. patent application Ser. No. 16/682,113, for SMART CORNER AND WALL FRAME SYSTEM filed on Nov. 13, 2019, which claims the benefit of U.S. Provisional Application No. 62/760,432 for FLOOR AND WALL MODULAR SYSTEM filed on Nov. 13, 2018, which are incorporated by reference as if fully set forth.

FIELD OF INVENTION

The present invention relates generally to the art of building construction, and more specifically to a smart corner, wall frame, and a method of connecting wall frames.

BACKGROUND

Wall frames are typically built on the job site. The wall frame is connected piece by piece. Traditionally the bottom plate is installed, a top plate is installed, and vertical studs are installed between the bottom plate and the top plate. A plurality of wall frames are installed adjacently and connected to build a wall framing system. This piecemealed construction is tedious and time consuming, which ultimately results in high construction costs.

SUMMARY

In one aspect, a smart corner is provided that can be prefabricated. The smart corner comprises a rear side including a first hole, a first side including a second hole, a second side including a third hole, and a top. A wall frame is also provided. The wall frame includes a top plate, a bottom plate, studs, and four smart corners. A framing system is also provided comprising at least two wall frames. The at least two wall frames connect via the smart corners.

BRIEF DESCRIPTION OF THE DRAWINGS

The foregoing summary, as well as the following detailed description will be better understood when read in conjunction with the appended drawings. For the purpose of illustration, there is shown in the drawings different embodiments. It should be understood, however, that the teachings are not limited to the precise floor and wall modular system arrangement shown.

DETAILED DESCRIPTION

A smart corner is provided. The smart corner includes a rear side, a first side, and a second side. The rear side has a first hole, the first side has a second hole, and the second side has a third hole. The smart corner is configured to connect with a top plate and a vertical stud or a bottom plate and a vertical stud to make a corner of a wall frame. At least two wall frames may be connected via the smart corners on the frames. The first, second, or third hole of a smart corner on a first wall frame may align with the first, second, or third hole of a smart corner on a second wall frame. A pin or connector connects the smart corners of the wall frames via the aligned holes. The smart corner is an apparatus that allows easy, quick, and efficient connection of wall frames. Moreover, the wall frames, including smart corners, may be prefabricated. Once shipped to the job site, the wall frames may be quickly installed, thereby cutting down the time and cost of construction.

Figure 1:
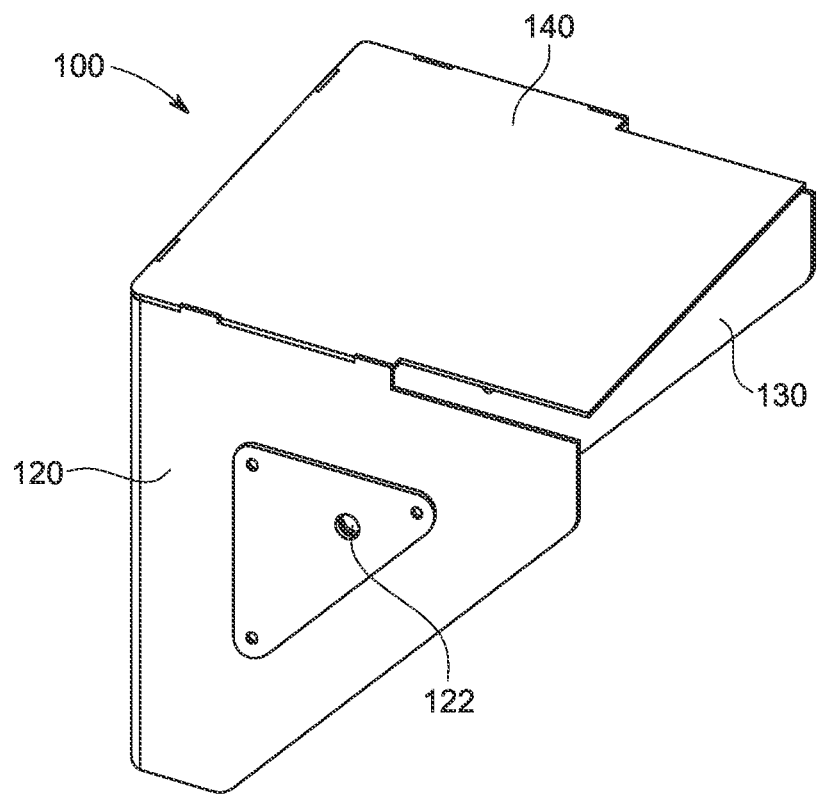
FIG. 1 is a front, right perspective view of a smart corner.

FIG. 1 is a front, right perspective view of a smart corner 100. The smart corner 100 includes a rear side 110 (not visible in FIG. 1), a first side 120, a second side 130, and a top 140. An edge of the first side 120 is connected to a first edge of the rear side 110 at an approximate 90 degree angle. The edge of the second side 130 is connected to a second edge opposite the first edge of the rear side 110 at an approximate 90 degree angle. A top 140 is connected to a top edge of the first side 120, a top edge of the rear side 110, and a top edge of the second side 130. The first side 120 has a hole 122, the rear side 110 has a hole 112 (not visible in FIG. 1), and the second side 130 has a hole 132 (not visible in FIG. 1). The holes 112, 122, 132 are configured to receive a connector such as a pin, screw and nut, bolt and nut, etc. The rear side 110, first side 120, and third side 130 may be double plated, as shown in FIG. 1, around the area of the first hole 110, second hole 120, and third hole 130. These areas may be double plated to create strength. Because these areas are built up, the remaining smart corner 100 may be thinner and may have a tighter radius. The smart corner 100 may be configured to be a corner of a wall frame as described in more detail herein. The smart corner 100 may be made from steel, aluminum, hard plastic, or any rigid material.

Figure 2:
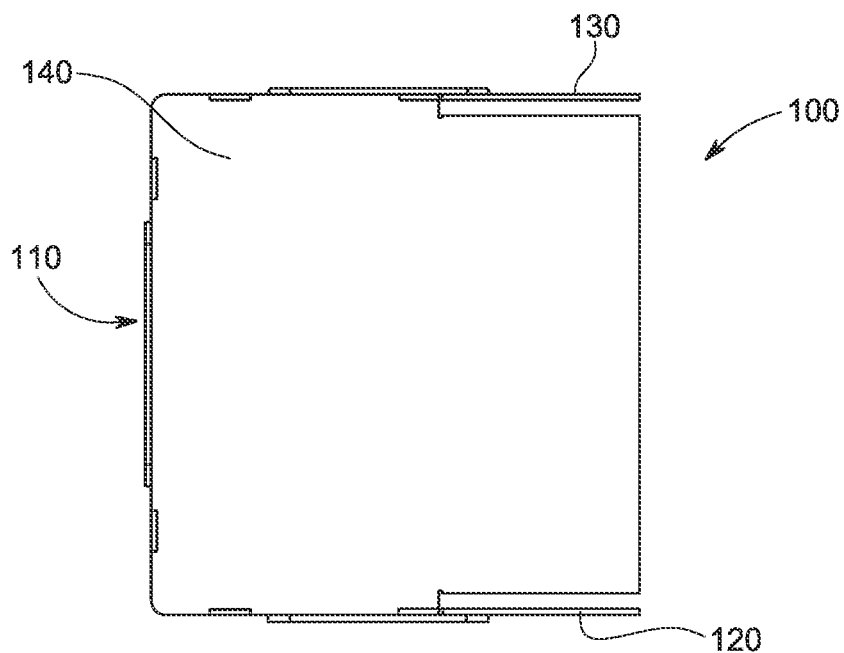
FIG. 2 is a top view of the smart corner.

FIG. 2 is a top view of the smart corner 100. The top side 140 is substantially square. The first side 120 is connected to the top side 140 at an approximate 90 degree angle. The rear side 110 is connected to the top side 140 at an approximate 90 degree angle. The second side 130 is connected to the top side 140 at an approximate 90 degree angle. The top side 140 helps stabilize the smart corner 100 structure and adds structure. There may be small space between a portion of the first side 120 and a portion of the top side 140 and between a portion of the second side 130 and a portion of the top side 140. These spaces allow flexibility and adjustment if the wall frame members connected to the smart corner 100 are not perfectly square.

Figure 3:
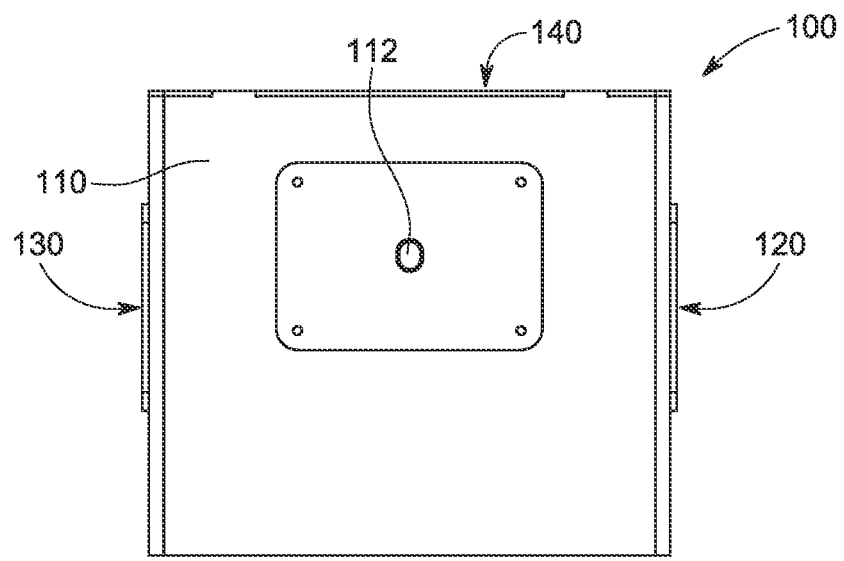
FIG. 3 is a rear view of the smart corner.

FIG. 3 is a rear view of the smart corner 100. The rear side 110 is substantially square and includes a first hole 112.

Figure 4:
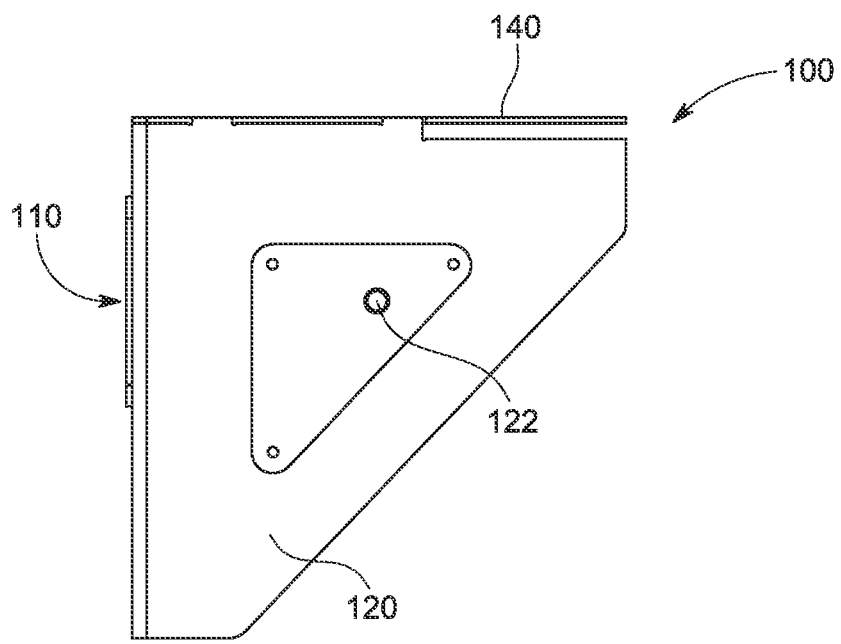
FIG. 4 is a right side view of the smart corner.

FIG. 4 is a right side view of the smart corner 100. FIG. 4 shows the first side 120. The first side 120 has a hole 122. Although not shown, the second side 130 is a mirror image of the first side 120. The first side 120 and the second side 130 may be substantially triangular as shown in FIG. 4. Alternatively, the first side 120 and the second side 130 may have other geometric shapes such as a square.

Figure 5:
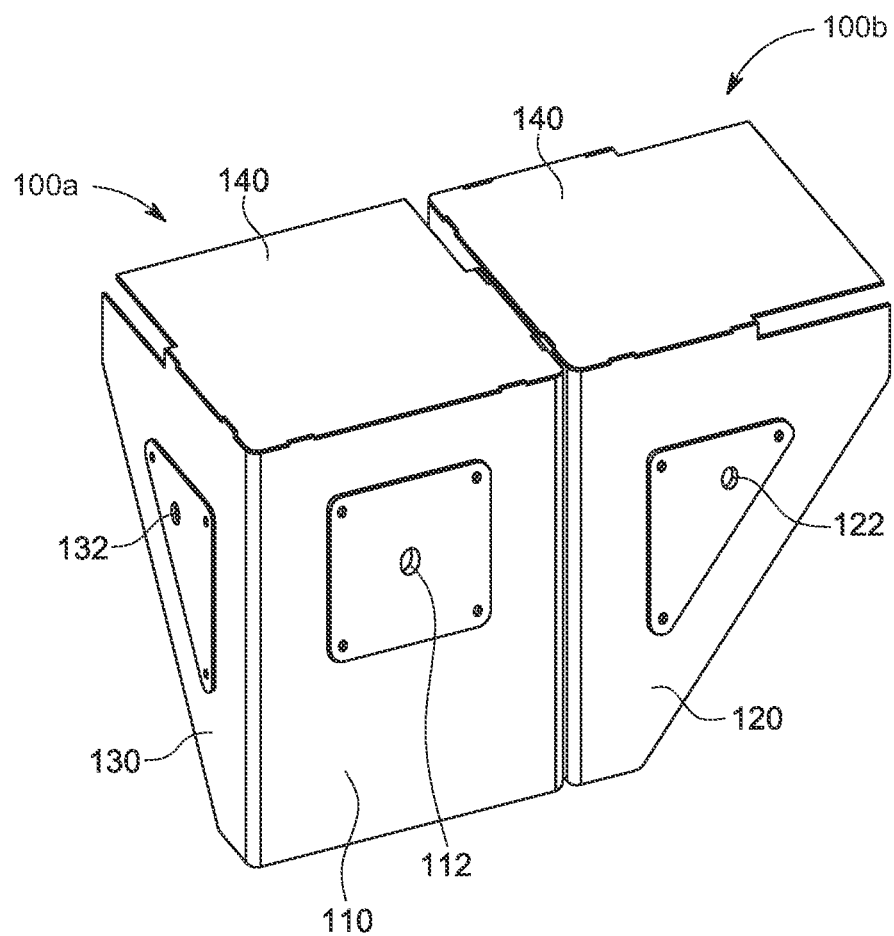
FIG. 5 is a front, right perspective view of two mated smart corners.

FIG. 5 is a front, right perspective view of two mated smart corners 100a, 100b. The first hole 112, the second hole 122, and the third hole 132 of a first smart corner 100a are located and designed to align with a first hole 112, second hole 122, or third hole 132 of a second smart corner 100b. Aligning holes 112, 122, 132 of a first smart corner 100a with holes 112, 122, 132 of a second smart corner 100b allows the two corners 100a, 100b to mate by sliding and securing a connecting device 150 through the aligned holes 112, 122, 132. For example, referring to FIG. 5, the second hole 122 of a first smart corner 100a may align and mate with a first hole 112 of a second smart corner 100b. The mated second hole 122 and first hole 112 are not visible in FIG. 1. Although the smart corner 100a in FIG. 5 is shown mated with another smart corner 100b via its second hole 122, the smart corner 100a may mate with another smart corner via its first hole 112, second hole 122, or third hole 132. Moreover, a smart corner may mate with multiple smart corners. For example, the first smart corner 100a in FIG. 5 may mate with a second smart corner 100b via its second hole 122, a third smart corner via its third hole 132, and a fourth smart corner via its first hole 112.

Figure 6:
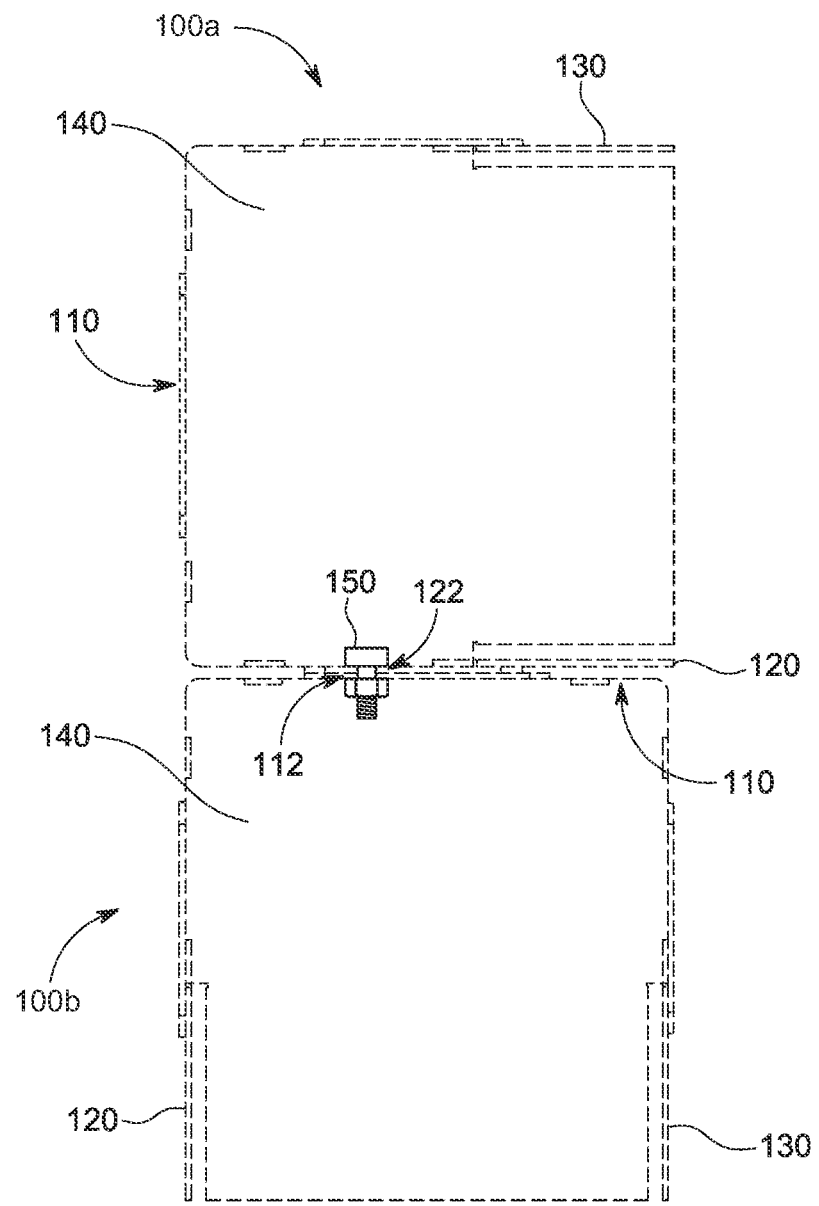
FIG. 6 is a top view of the two mated smart corners of FIG. 5.

FIG. 6 is a top view of the two mated smart corners 100a, 100b of FIG. 5. The first smart corner 100a and the second smart corner 100b are shown with a dotted line to illustrate the smart corners 100a, 100b transparently. The smart corners 100 are drawn transparently to show the connection of the two smart corners 100a, 100b. The smart corners 100a, 100b are connected with a connecting device 150 such as a screw and nut shown in FIG. 6. The connecting device 150 slides through the aligned holes 122, 112 to secure the smart corners 100a, 100b together. The connecting device 150 prevents the smarts corners 100a, 100b from moving translationally.

Figure 7:
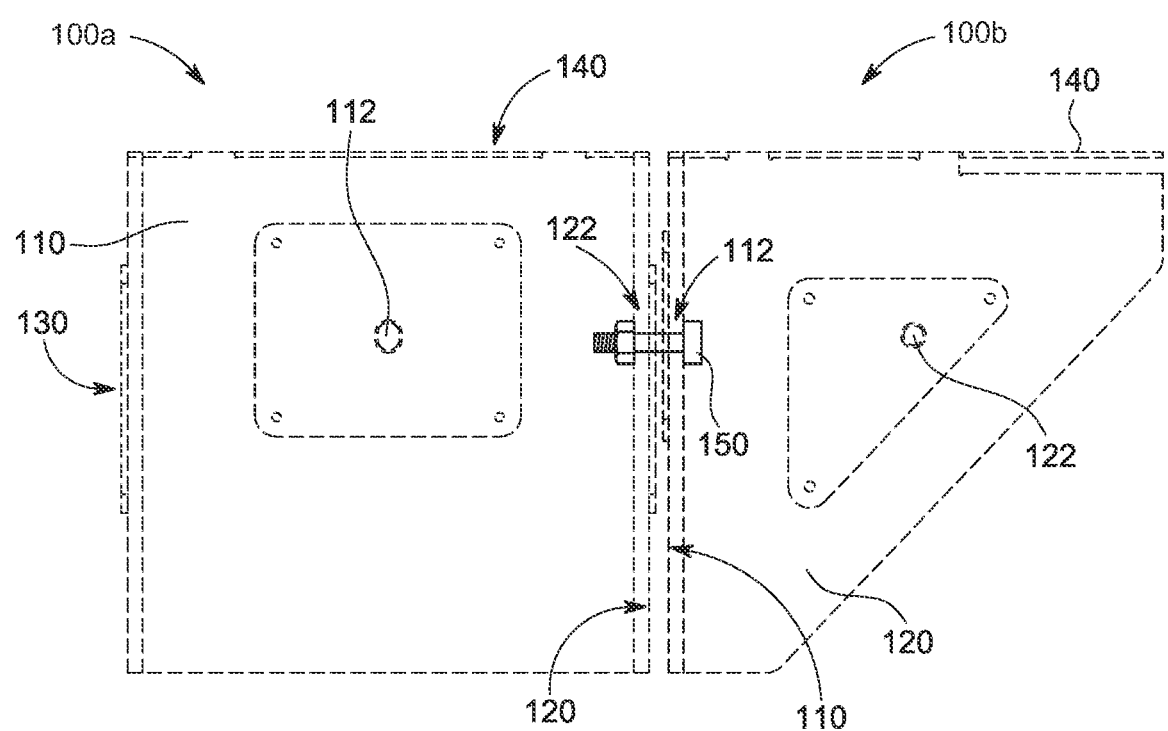
FIG. 7 is a front view of the two mated smart corners of FIG. 5.

FIG. 7 is a front view of the two mated smart corners 100a, 100b of FIG. 5. The first smart corner 100a and the second smart corner 100b are shown with a dotted line to show the connecting device 150 within the smart corners 100a, 100b. The connecting device 150 pinches or clamps the smart corners 100a, 100b together.

Figure 8:
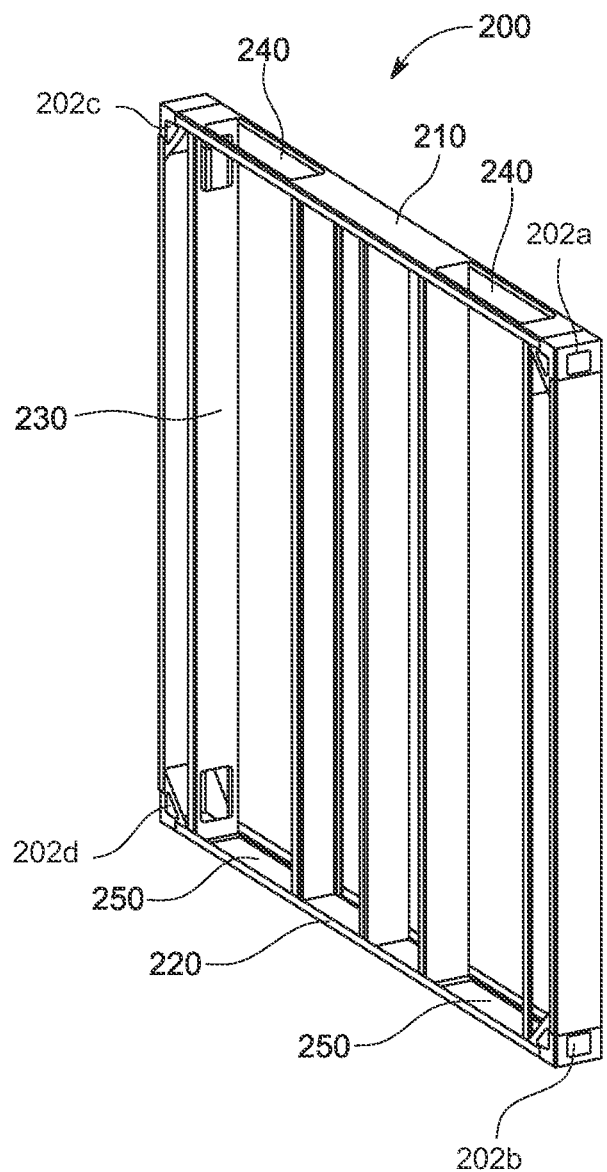
FIG. 8 is a front, right perspective view of a wall frame.

FIG. 8 is a front, right perspective view of a wall frame 200. The wall frame 200 comprises a top plate 210, a bottom plate 220, vertical studs 230, and four smart corners 202a-d. The wall frame 200 may also include cross braces (not shown in FIG. 8). Each smart corner 202a-d includes the same features, components, and embodiments of a smart corner 100 previously discussed in detail. A smart corner 202a-d connects to each corner of the wall frame 200. The smart corners 202a-d on the wall frame 200 allow the wall frame 200 to be connected to at least one other wall frame 200 via the smart corners 202a-d. The smart corner 202a-d may be connected to the wall frame 200 via a fastener such as a pin. This same fastener may be used to the mate one corner of a wall frame 200 with another corner of a wall frame.

The wall frame 200 may also include at least one opening 240 in the top plate 210 and at least one opening 250 in the bottom plate 220. Although FIG. 8 depicts two openings 240 in the top plate 210 and two openings 250 in the bottom plate 220, the top plate 210 and the bottom plate 220 may include more or less openings 240, 250. The openings 240 in the top plate 210 align with the openings 250 in the bottom plate 220. These openings 240, 250 allow plumbing, electrical wire, conduit, etc. to easily extend from floor to floor of a building. Preferably, the top plate 210, bottom plate 220, and studs 230 are aluminum, steel, wood, hard plastic, or any other structurally rigid material. The wall frame 200 may be prefabricated.

Figure 9:
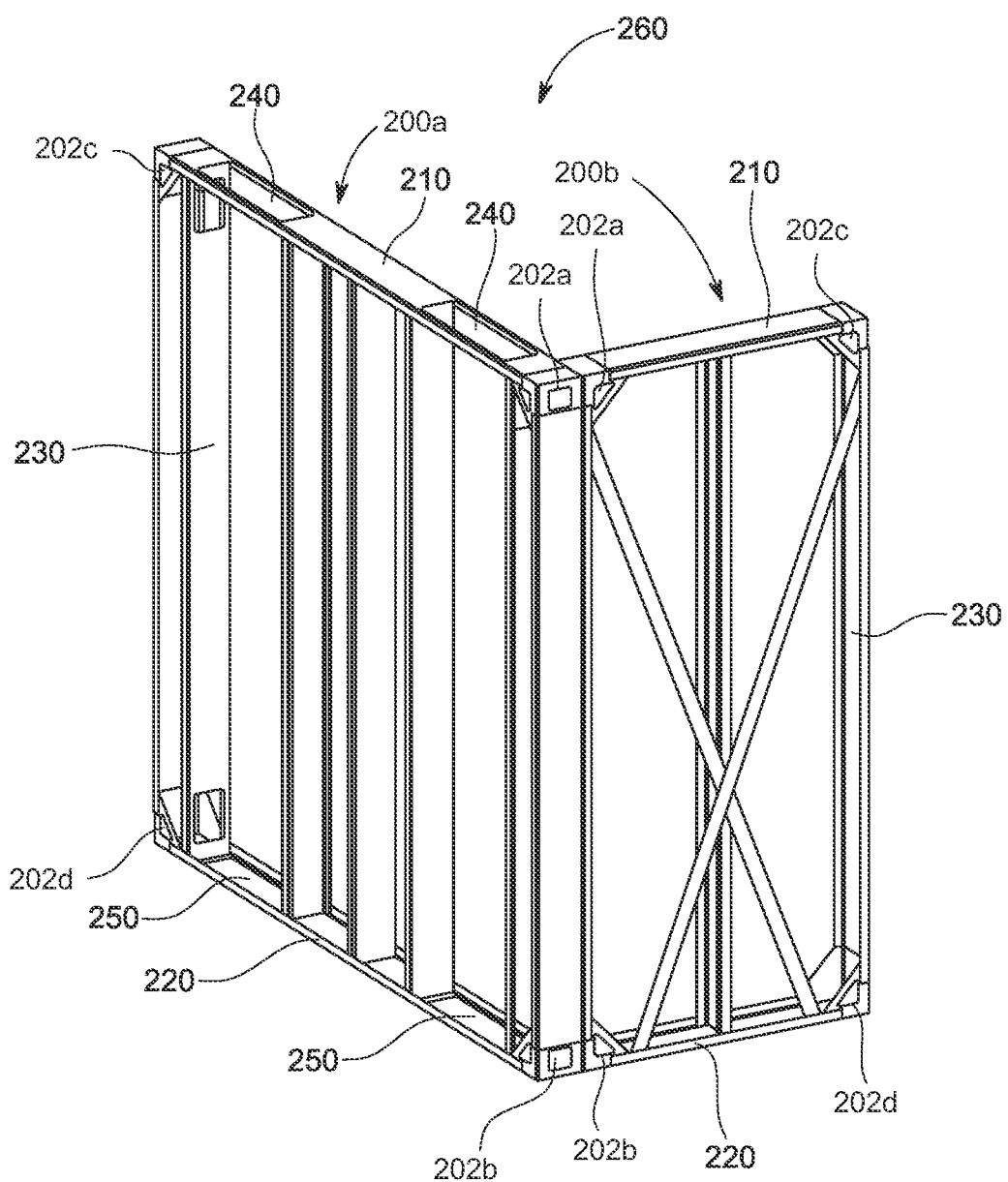
FIG. 9 is a front, right perspective view of two mated wall frames.

FIG. 9 is a front, right perspective view of two mated wall frames 200a, 200b. FIG. 9 shows a wall frame system 260 comprising two wall frames 200a, 200b connected by smart corners 202a, 202b The wall frames 200a, 200b and the smart corners 202a-d include the same features, components, and embodiments of a wall frame 200 and smart corner 100 previously discussed in detail. Although FIG. 9 illustrates a wall frame system 260 with two wall frames 200a, 200b, the wall frame system 260 may comprise any number of wall frames 200 connected by smart corners 100a-d. The wall frames 200a, 200b in FIG. 9 are connected by mating a first smart corner 202a of a first wall frame 200a with a first smart corner 202a of a second wall frame 200b and by mating a second smart corner 202b of a first wall frame 200a with a second smart corner 202b of a second wall frame 200b.

Figure 10:
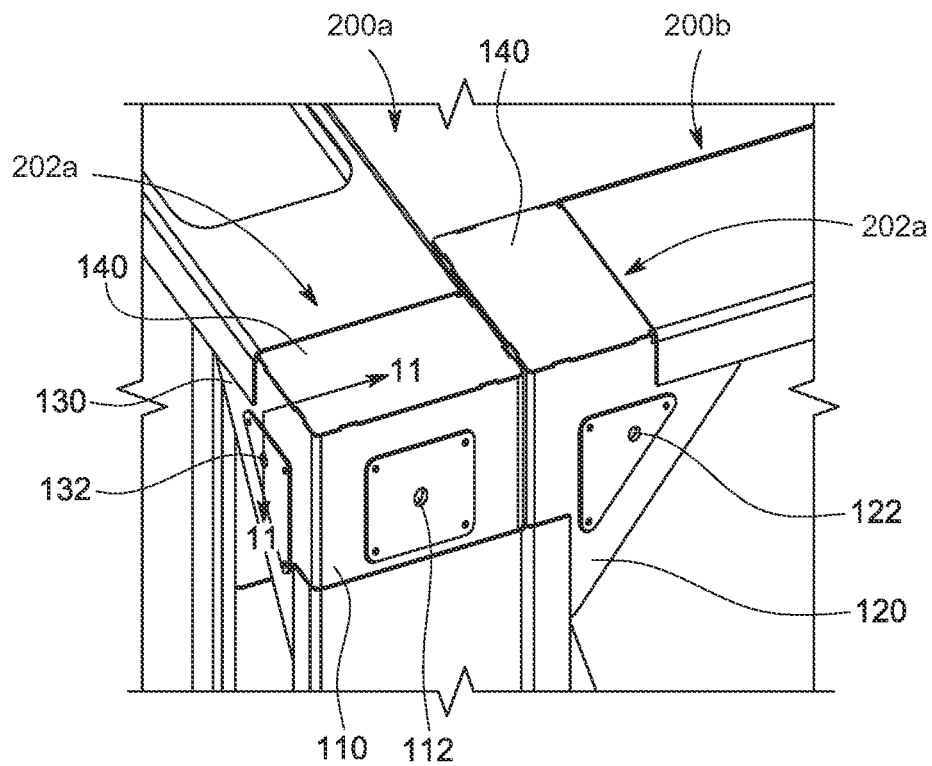
FIG. 10 is a front, right perspective view of two mated smart corners of FIG. 9.

FIG. 10 is a front, right perspective view of two mated smart corners 202a of FIG. 9. FIG. 10 shows the first smart corner 202a of the first wall frame 200a and the first smart corner 202a of the second wall frame 200b. The first wall frame 200a is connected to the second wall frame 200b via the second hole 122 of the first smart corner 202a of the first wall frame 200a and the first hole 112 of the first smart corner 202a of the second wall frame 200b.

Figure 11:
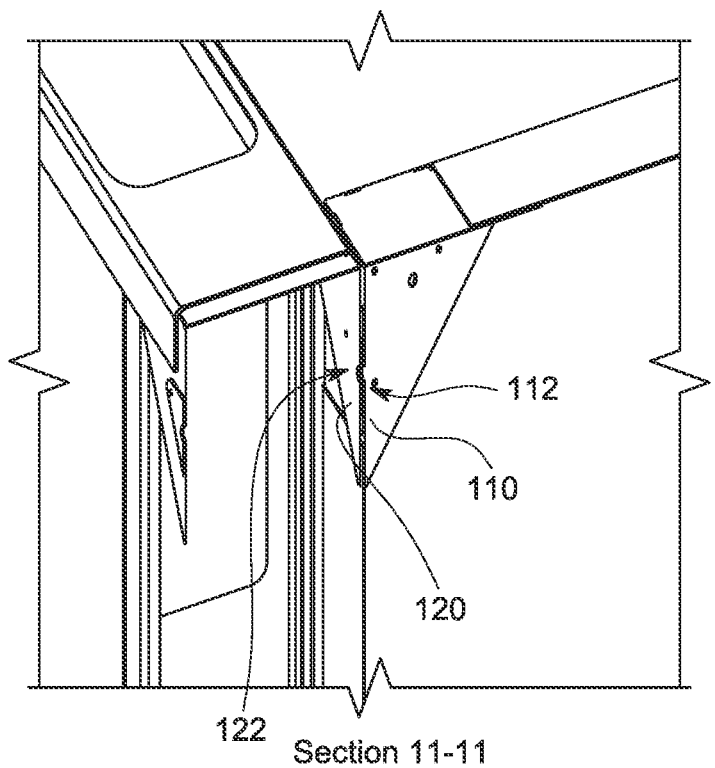
FIG. 11 is a section view of cross-section 11-11 in FIG. 10.

FIG. 11 is a section view of cross-section 11-11 in FIG. 10. The section view in FIG. 11 shows the second hole 122 of the first smart corner 202a of the first wall frame 200a aligned with the first hole 112 of the first smart corner 202a of the second wall frame 200b. The smart corners 202a-d of the wall frames 200a, 200b may connect via any hole 112, 122, 132 in any two smart corners 202a-d. The aligned holes 112, 122, 132 of the smart corners 202a-d of the wall frames 200a, 200b are secured via a connecting device 150 previously described and shown in FIG. 6 and FIG. 7.

Figure 12:
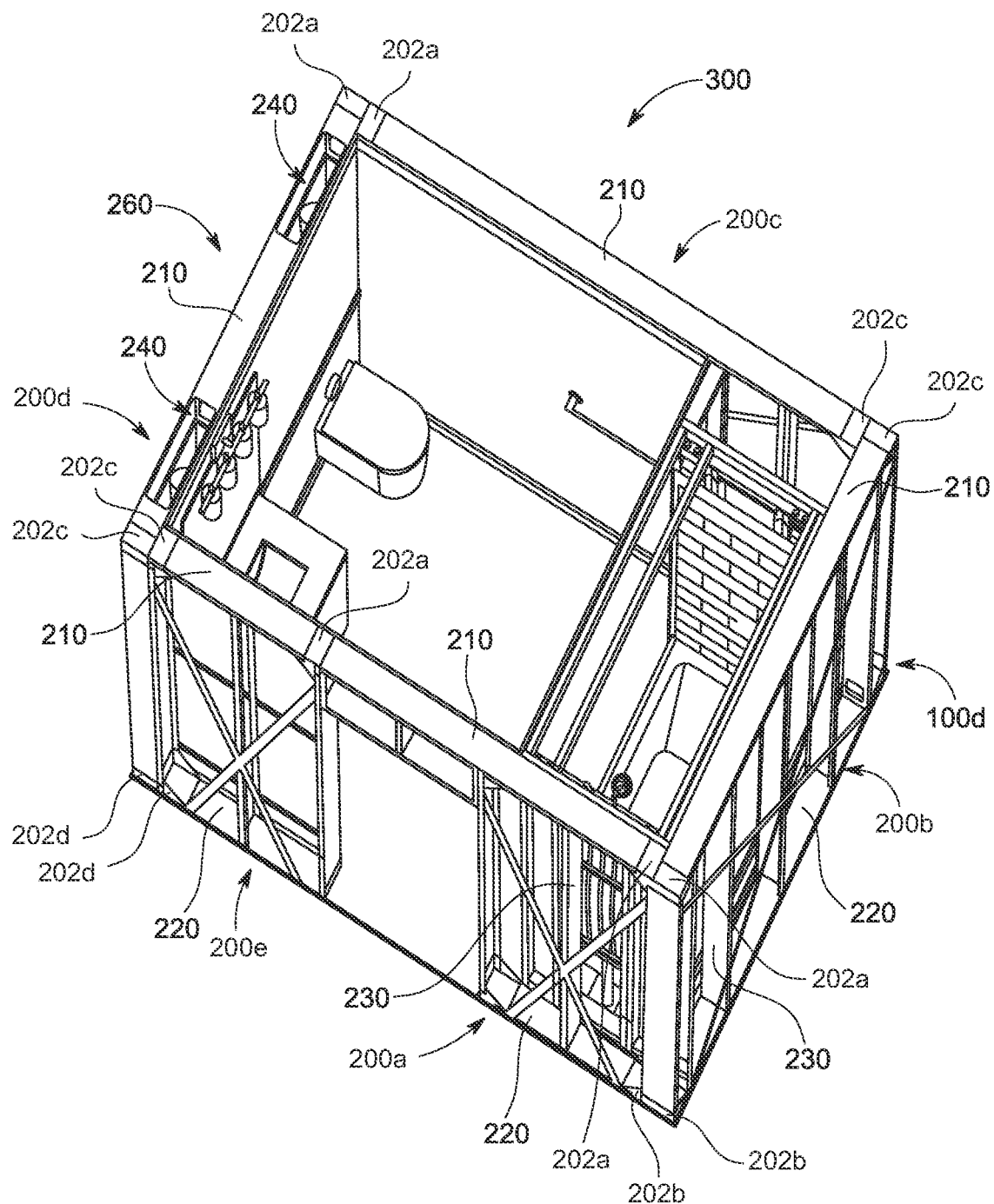
FIG. 12 is a top, right perspective view of a room including a wall frame system.

FIG. 12 depicts an example room 300 including a wall frame system 260. The wall frame system 260 includes the same features, components, and embodiments of a wall frame system 260 previously discussed in detail. The wall frame system 260 is made from a plurality of wall frames 200a-e connected together via smart corners 202a-d. The smart corners 202a-d of the wall frame 200a-e allow the wall frame 200a-e to securely connect with one or more other wall frames 200a-e. Thus, these wall frames 200a-e can be prefabricated in a factory, shipped to a job site, and easily and quickly connected on site to build the frame 260 of a room 300 as shown in FIG. 12.

Figure 13:
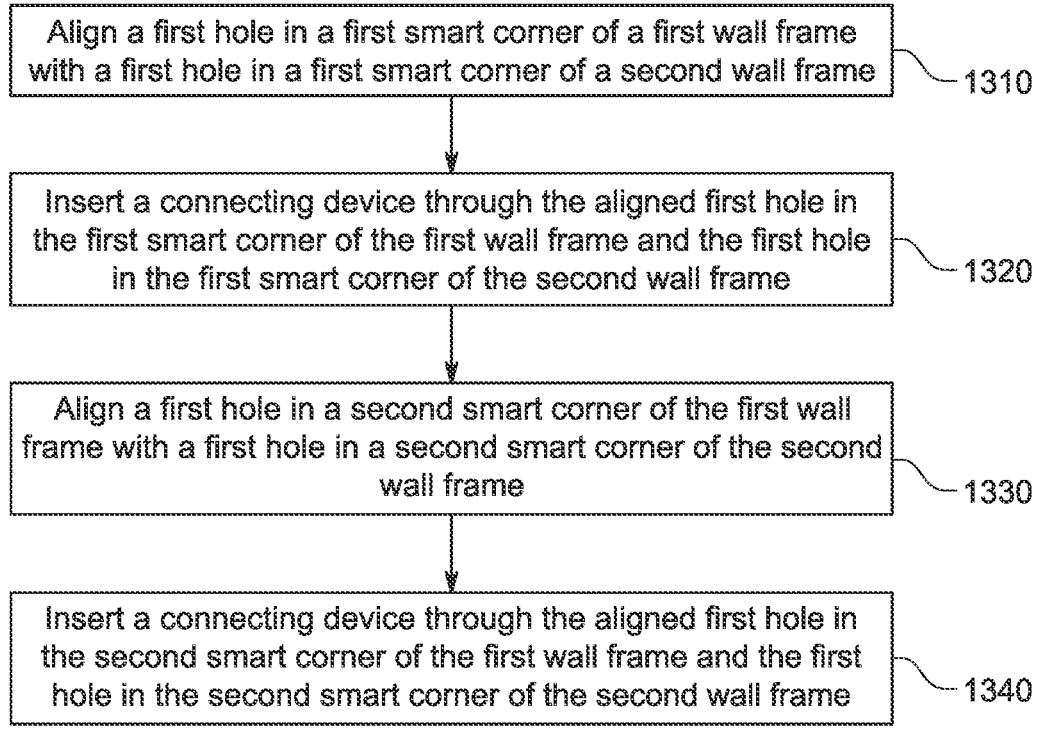
FIG. 13 is a flow chart of a method of assembling a wall frame system.

FIG. 13 is a flow chart of a method of assembling a wall frame system 1300. In step 1310, a first hole in a first smart corner 202a of a first wall frame 200a is aligned with a first hole in a first smart corner 202a of a second wall frame 200b. In step 1320, a connecting device 150 is inserted through the aligned first hole in the first smart corner 202a of the first wall frame 200a and the first hole in the first smart corner 202a of the second wall frame 200b. In step 1330, a first hole in a second smart corner 202b of the first wall frame 200a is aligned with a first hole in a second smart corner 202b of the second wall frame 200b. In step 1340, a connecting device 150 is inserted through the aligned first hole in the second smart corner 202b of the first wall frame 200a and the first hole in the second smart corner 202b of the second wall frame 200b. The first hole referenced in the method 1300 may be the first hole 112 in the rear side 110 of the smart corner 202, the second hole 122 in the first side 120 of the smart corner 100, or the third hole 132 in the second side 130 of the smart corner 202.

The method 1300 may also include receiving at least two wall frames 200a, 200b. The wall frames 200a, 200b include the details and embodiments previously discussed. Steps 1310 to 1340 may be repeated to connect more than two wall frames 200a-n together.

Having thus described in detail a preferred selection of embodiments of the present invention, it is to be appreciated and will be apparent to those skilled in the art that many physical changes could be made to the smart corner, the wall frame, the wall frame system, and the method of connecting wall frames without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A wall frame system comprising:
   a first wall frame defined by a top member and a bottom member interconnected by a plurality of vertical members, the first wall frame further including a first smart corner and a second smart corner; and
   a second wall frame defined by a top member and a bottom member interconnected by a plurality of vertical members, the second wall frame further including a third smart corner and a fourth smart corner;
   the first smart corner, the second smart corner, the third smart corner, and the fourth smart corner each including:
      a rear side including a first hole;
      a first side including a second hole, the first side connected to the rear side along a first edge; and
      a second side including a third hole, the second side connected to the rear side along a second edge opposite the first edge;
   the third smart corner connected with the first smart corner via a first connecting device through at least one of the first hole, the second hole, or the third hole of the third smart corner and at least one of the first hole, the second hole, or the third hole of the first smart corner; and
   the fourth smart corner connected with the second smart corner via a second connecting device through at least one of the first hole, the second hole, or the third hole of the fourth smart corner and at least one of the first hole, the second hole, or the third hole of the second smart corner.

2. The wall frame system of claim 1, wherein the first wall frame includes a fifth smart corner and a sixth smart corner.

3. The wall frame system of claim 1, wherein the second wall frame includes a seventh smart corner and an eighth smart corner.

4. The wall frame system of claim 1, wherein the wall frame system is configured to be a building wall frame system.

5. The wall frame system of claim 1, wherein each smart corner is made of at least one of steel, aluminum, and hard plastic.

6. The wall frame system of claim 1, wherein each said top member comprises a top plate, each said bottom member comprises a bottom plate, and each said plurality of vertical members comprises a plurality of vertical studs.

7. The wall frame system of claim 6, wherein the first smart corner is connected to the top plate and a first vertical stud of the plurality of studs of the first wall frame, the second smart corner is connected to the bottom plate and the first vertical stud of the plurality of studs of the first wall frame, the third smart corner is connected to the top plate and a first vertical stud of the plurality of studs of the second wall frame, and the fourth smart corner is connected to the bottom plate and the first vertical stud of the plurality of studs of the second wall frame.

8. The wall frame system of claim 6, wherein the top plate, the bottom plate, and the plurality of studs are wood.

9. The wall frame system of claim 6, wherein the top plate, the bottom plate, and the plurality of studs are metal.

10. The wall frame system of claim 6, wherein the top plate has at least one first opening and the bottom plate has at least one second opening, the first opening and the second opening align.

11. The wall frame system of claim 6, wherein the first connecting device is a first bolt and a first nut and the second connecting device is a second bolt and a second nut.

12. A method of connecting the wall frame system of claim 1 comprising:
    aligning one of the holes of the first smart corner of the first wall frame with one of the holes of the third smart corner of the second wall frame;
    inserting the first connecting device through the aligned hole of the first smart corner of the first wall frame and the aligned hole of the third smart corner of the second wall frame;
    aligning one of the holes of the second smart corner of the first wall frame with one of the holes of the fourth smart corner of the second wall frame; and
    inserting the second connecting device through the aligned hole of the second smart corner of the first wall frame and the aligned hole of the fourth smart corner in the second wall frame.

13. The method of claim 12, further comprising receiving the first wall frame and the second wall frame.

14. The method of claim 12, wherein the first side and the second side are substantially triangular.

15. The method of claim 12, wherein the first side and the second side are parallel.

16. The method of claim 12, wherein the first side and the second side are connected to the rear side at 90 degree angles.

17. The method of claim 12, wherein each wall frame is configured to be a wall frame of a building.

18. The method of claim 12, wherein each smart corner includes a top side connected to the rear side, the first side, and the second side.

19. The method of claim 18, wherein the top side and the rear side are substantially square.

* * * * *